United States Patent
Olsson

(10) Patent No.: US 12,469,478 B2
(45) Date of Patent: Nov. 11, 2025

(54) REVOLVING VALVE FOR FEEDING AIR PULSES TO A RESONANCE TUBE FOR GENERATING LOW-FREQUENCY SOUND AND A METHOD FOR FEEDING THESE PULSES IN AN OPTIMAL WAY

(71) Applicant: Tallstam AB, Bromma (SE)

(72) Inventor: Mats Olsson, Lidingö (SE)

(73) Assignee: Tallstam AB, Bromma (SE)

( * ) Notice: Subject to any disclaimer, the term of this patent is extended or adjusted under 35 U.S.C. 154(b) by 216 days.

(21) Appl. No.: 18/275,541

(22) PCT Filed: Feb. 1, 2022

(86) PCT No.: PCT/EP2022/052362
§ 371 (c)(1),
(2) Date: Aug. 2, 2023

(87) PCT Pub. No.: WO2022/167425
PCT Pub. Date: Aug. 11, 2022

(65) Prior Publication Data
US 2024/0127779 A1    Apr. 18, 2024

(30) Foreign Application Priority Data
Feb. 2, 2021  (SE) .................... 2130031-4

(51) Int. Cl.
*G10K 9/04*   (2006.01)
*F16K 5/04*   (2006.01)
(52) U.S. Cl.
CPC .............. *G10K 9/04* (2013.01); *F16K 5/0407* (2013.01)

(58) Field of Classification Search
CPC ............ F16K 5/0407; F16K 3/24; G10K 9/04
See application file for complete search history.

(56) References Cited

U.S. PATENT DOCUMENTS 5,005,511 A * 4/1991 Olsson ..................... F28G 7/00
                                                         116/137 R
5,109,948 A    5/1992 Sandstrom
(Continued)

FOREIGN PATENT DOCUMENTS

EP    1542810 A1   6/2005
JP    2002-018357 A   1/2002
(Continued)

OTHER PUBLICATIONS

English translation of JP 2002018357 A, accessed via PE2E Search on May 1, 2025 (Year: 2002).*

(Continued)

*Primary Examiner* — Jeremy A Luks
(74) *Attorney, Agent, or Firm* — MEDLER FERRO WOODHOUSE & MILLS PLLC

(57) ABSTRACT

A method for feeding pressurized air pulses to a quarter wave resonance tube, for generating a standing low-frequency sound wave in said quarter wave resonance tube. The method entails that the pressurized air pulses supply maximum input power to said standing low-frequency sound wave by feeding said pressurized air pulses only during the time intervals of the oscillation cycle when the air pressure in said rear end of the quarter wave resonance tube, is positive. Also disclosed is a revolving valve, for feeding pressurized air pulses to a quarter wave resonance tube, for generating a standing low-frequency sound wave in said quarter wave resonance tube.

10 Claims, 20 Drawing Sheets

(56) References Cited

U.S. PATENT DOCUMENTS

2002/0118601 A1 8/2002 Freund
2011/0243796 A1 10/2011 Ovelius
2016/0052021 A1* 2/2016 Ellebro .................... B06B 1/20
                                                                165/95

FOREIGN PATENT DOCUMENTS

| JP | 2013-213459 A | 10/2013 | |
|----|----|----|----|
| SE | 8802452 L | 12/1989 | |
| WO | 82/01328 A1 | 4/1982 | |
| WO | 2004/009255 A1 | 1/2004 | |
| WO | WO-2015133966 A1 * | 9/2015 | ............. B08B 7/026 |

OTHER PUBLICATIONS

International Search Report and Written Opinion received for PCT Patent Application No. PCT/EP2022/052362, mailed on Apr. 5, 2022, 12 pages.

* cited by examiner

Cross-section A-A

Cross-section A-A

REVOLVING VALVE FOR FEEDING AIR PULSES TO A RESONANCE TUBE FOR GENERATING LOW-FREQUENCY SOUND AND A METHOD FOR FEEDING THESE PULSES IN AN OPTIMAL WAY

CROSS-REFERENCE TO PRIOR APPLICATION

This application is a § 371 National Stage Application of PCT International Application No. PCT/EP2022/052362 filed Feb. 1, 2022, which claims the priority of Swedish Application No. 2130031-4, filed Feb. 2, 2021, each of which are herein incorporated by reference in their entirety.

TECHNICAL FIELD

Embodiments herein relate to methods for feeding pressurized air pulses to the rear end of a quarter wave resonance tube for generating of a standing low-frequency sound wave in said quarter wave resonance tube. Other embodiments relate to revolving valve, consisting of a stationary outer cylinder, and an inner rotating cylinder, with a through hole, for supplying pressurized air pulses to the rear end of a quarter wave resonance tube, for generating a standing low-frequency sound wave in said quarter wave resonance tube.

BACKGROUND AND PRIOR ART

It is known from the European patent EP 1 542 810 B1 that low-frequency sound can be generated by feeding pressurized air pulses to the rear end of a quarter wave resonance tube. In the embodiment according to the cited patent, the pressurized air pulses are supplied via a feeder unit having a piston moving in a cylinder.

Another way of generating low-frequency sound is described in patent SE 8802452-6. In the embodiment according to the cited patent, the low-frequency sound is generated by a motor-driven piston that moves back and forth in a cylinder.

In both cases cited, sinusoidal pressure variations in the air in the rear end of the quarter wave resonance tube occur.

However, there are a couple of problems associated with equipment according to the two cited patents.

One problem is that the air inside the quarter wave resonance tube often contains particles which give rise to deposits on the moving surfaces which in turn causes operational disruptions.

Another problem with the invention according to the patent EP 1 542 810 B1 is that the movement of the piston in the cylinder is controlled by the sound pressure at the rear end of the quarter wave resonance tube. In the first moments after the pressurized air has been switched on and the piston is to start moving, the sound pressure in the rear end is very low, which sometimes means that the force on the piston, that the sound pressure creates, is unable to overcome the frictional force between the outer surface of piston and the inner surface of the cylinder, resulting in that the movement does not start.

A problem with equipment according to the patent SE 8802452-6 is wear on the moving surfaces since the piston must have a relatively high speed.

Another problem with equipment according to the patent SE 8802452-6 is that no pressurized air is supplied. If the equipment is connected to an industrial process with a high gas temperature and if said gas contains large amounts of particles, there is a great risk that the moving parts of the equipment are exposed to high temperature gas which contain large amounts of particles, which means a risk of high friction and the equipment stops.

SUMMARY

The object of the present invention is to provide a method and a revolving valve that overcomes the problems mentioned above.

A further problem will now be described. One problem with the equipment according to the patent EP 1 542 810 B1 is that the supply of pressurized air also takes place during time intervals of the oscillation cycle when the air pressure in the rear end of the quarter wave is low and thereby only gives a small addition to the in-put power. It is even the case that the supply of pressurized air also takes place during the time intervals of the oscillation cycle when the air pressure in the quarter wave resonance tube is negative, thereby reducing the in-put power.

The present invention relates to a method for feeding pressurized air pulses to the closed rear end of a quarter wave resonance tube for generating a standing low-frequency sound wave in said quarter wave resonance tube.

The method entails that said pressurized air pulses, with a given total supplied air volume during each oscillation cycle of the standing low-frequency sound wave, supply maximum in-put power to said standing low-frequency sound wave by feeding said pressurized air pulses only during the time intervals of the oscillation cycle when the air pressure, ie sound pressure, in said rear end of the quarter wave resonance tube is positive.

The present invention also relates to a revolving valve that feeds pressurized air pulses to the rear end of a quarter wave resonance tube for generating a standing low-frequency sound wave in said quarter wave resonance tube.

Said revolving valve enables that said pressurized air pulses, with a given total supplied air volume during each oscillation cycle, supply maximum in-put power to said standing low-frequency sound wave by feeding said pressurized air pulses only during the time intervals of the oscillation cycle when the air pressure, ie sound pressure, in said rear end of the quarter wave resonance tube is positive.

DETAILED DESCRIPTION

The present description is now to be explained more closely by means of embodiments, which are disclosed as examples, and with reference to attached drawings.

FIG. 1 shows a feeder unit for supplying air pulses, 7, to the rear end of a quarter wave resonance tube (not shown in the figure). A constant air flow, 5, is supplied to a surge air tank, 4, via an inlet pipe, 6. The air pulses, 7, are created by the air flow from the surge air tank, 4, passing through a revolving valve, 1, which is driven by a speed-controlled electric motor, 2, via a shaft, 3. The revolving valve, 1, has the same rotational frequency and is in phase with the standing low-frequency sound wave in the quarter wave resonance tube FIG. 2 shows a low-frequency sound generator where the feeder unit according to FIG. 1 is mounted on a quarter wave resonance tube, 8. The air pressure (sound pressure) in the resonance tube, 8, is measured with the pressure sensor, 9, and can be read on the pressure gauge, 10.

Figure 1:
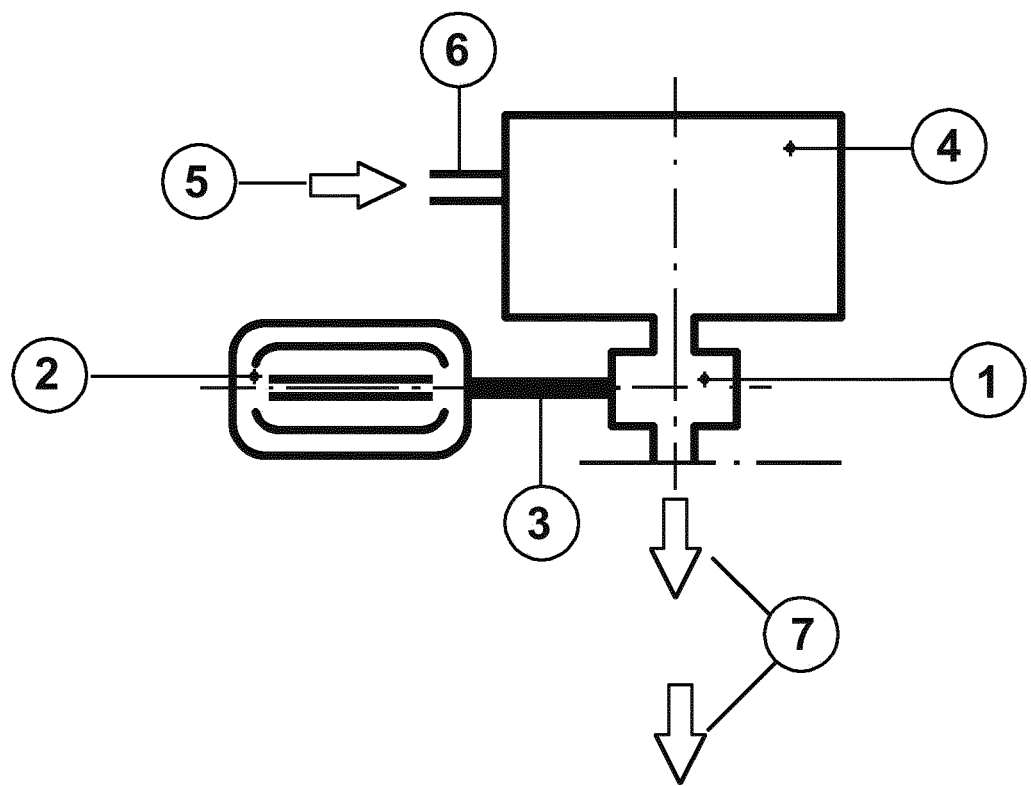
Figure 2:
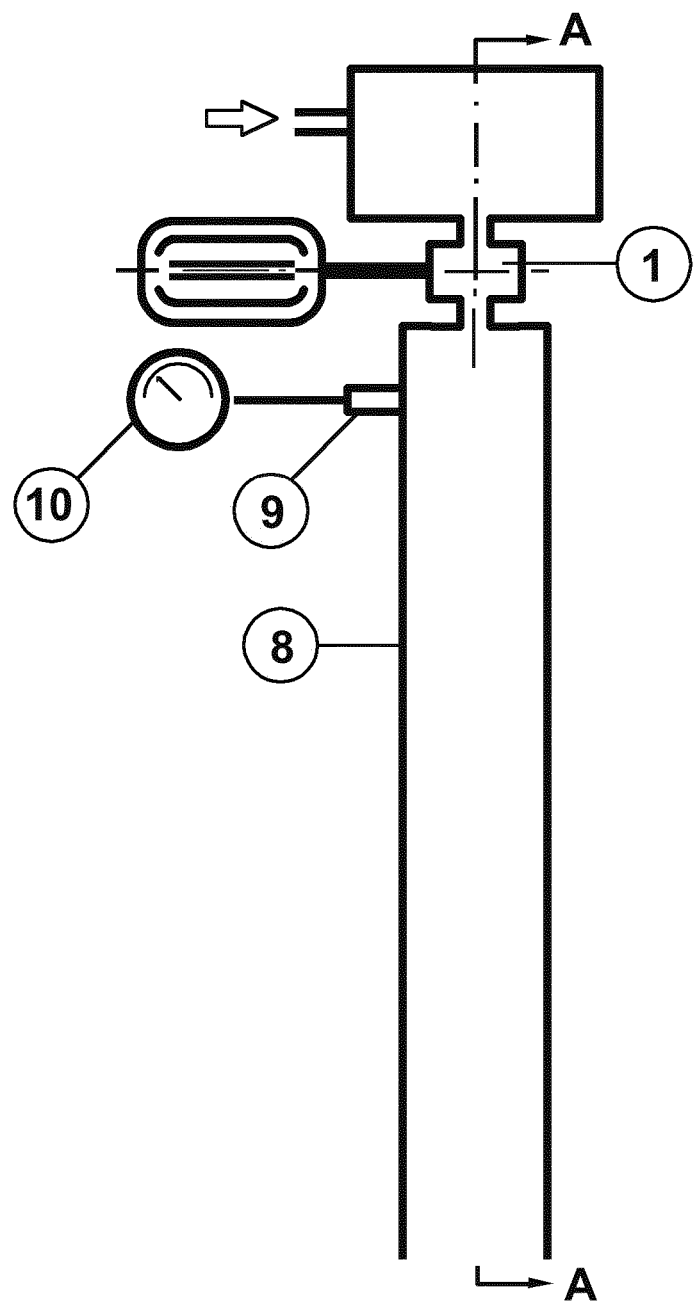
Figure 3:
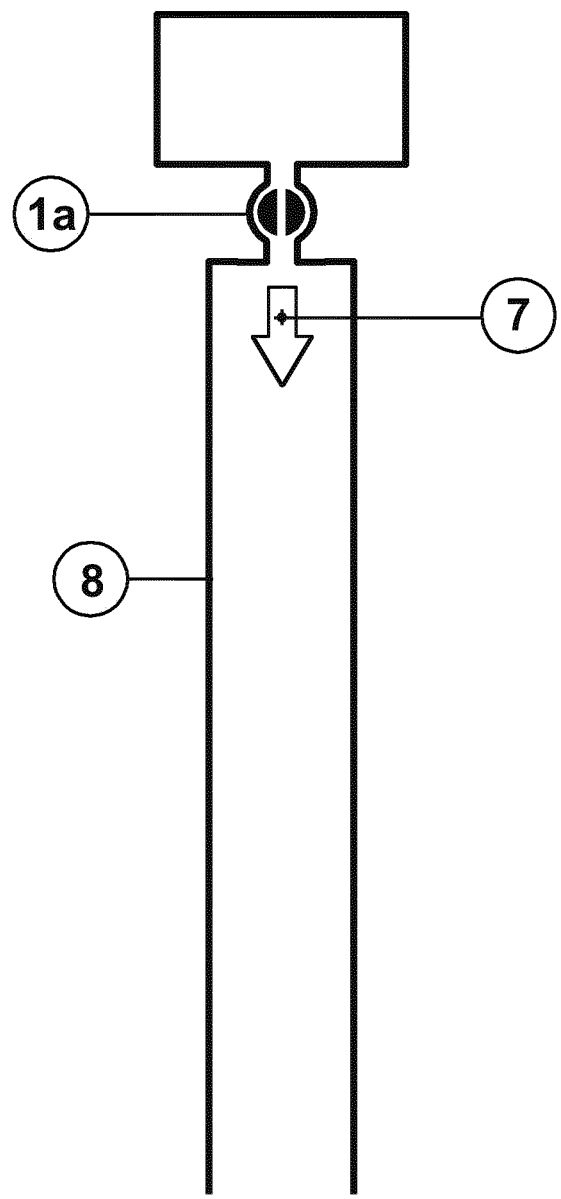
FIG. 3 shows a cross-section of the low-frequency sound generator in FIG. 2 at a time step when the revolving valve, 1a, is open.
Figure 4:
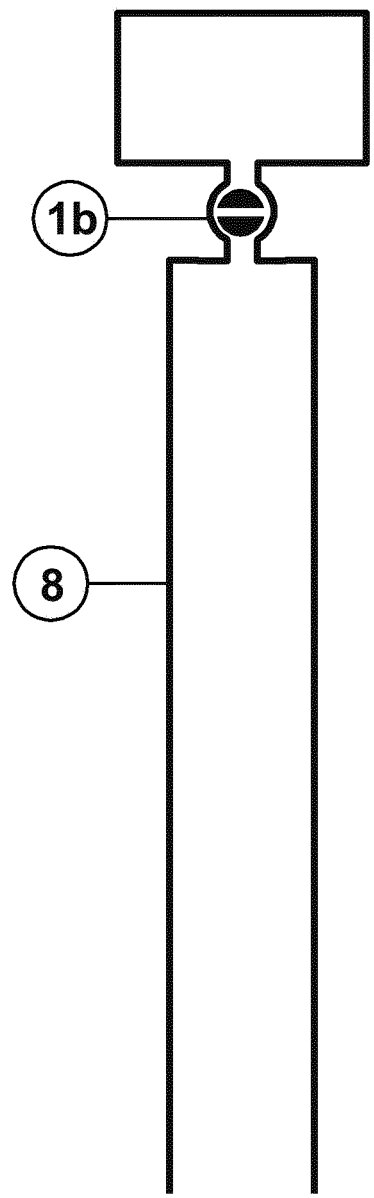
FIG. 4 shows a cross-section of the low-frequency sound generator in FIG. 2 at a time step when the revolving valve, 1*b*, is closed.
Figure 5:
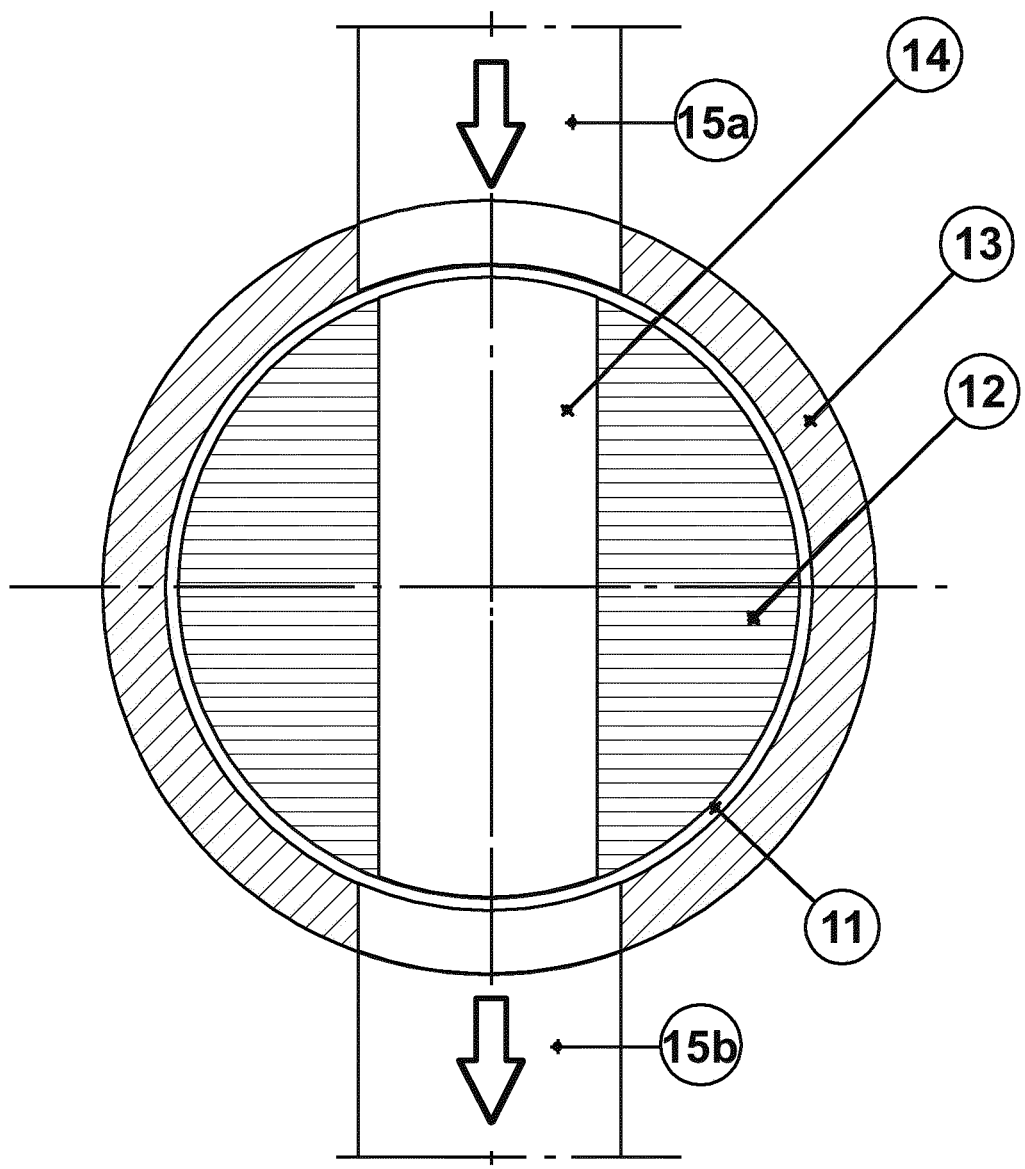

FIG. 5 shows the revolving valve, 1, consisting of an outer cylinder, 13, and an inner revolving cylinder, 12. There is a small gap, 11, between the two cylinders. The inner revolving cylinder, 12, has a through hole, 14. In the time moment shown in FIG. 5, the revolving valve, 1, is completely open, which means that an air pulse, 15*a*, 15*b*, can pass through the through hole, 14.

Figure 6:
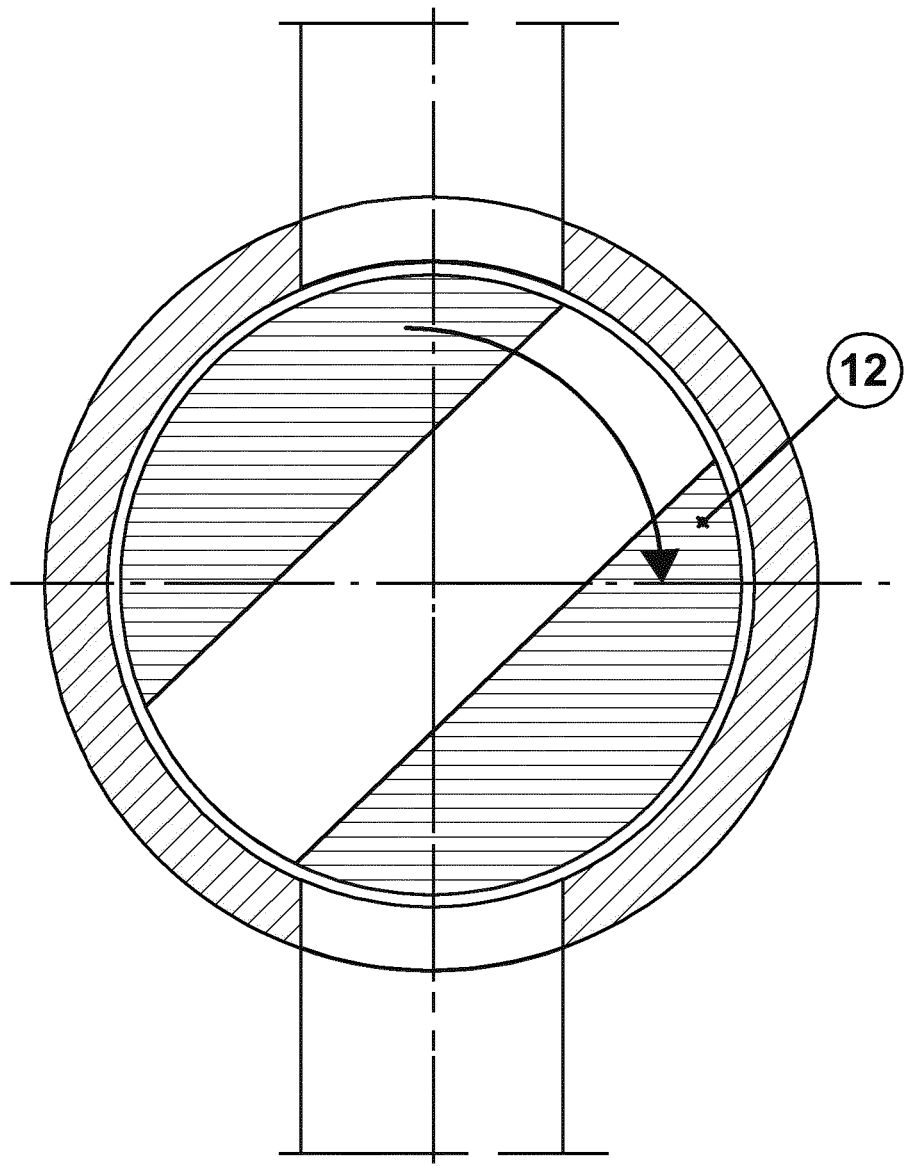

FIG. 6 shows the inner revolving cylinder, 12, of the revolving valve, 1, in position when it has just closed the air flow from the surge air tank, 4.

Figure 7:
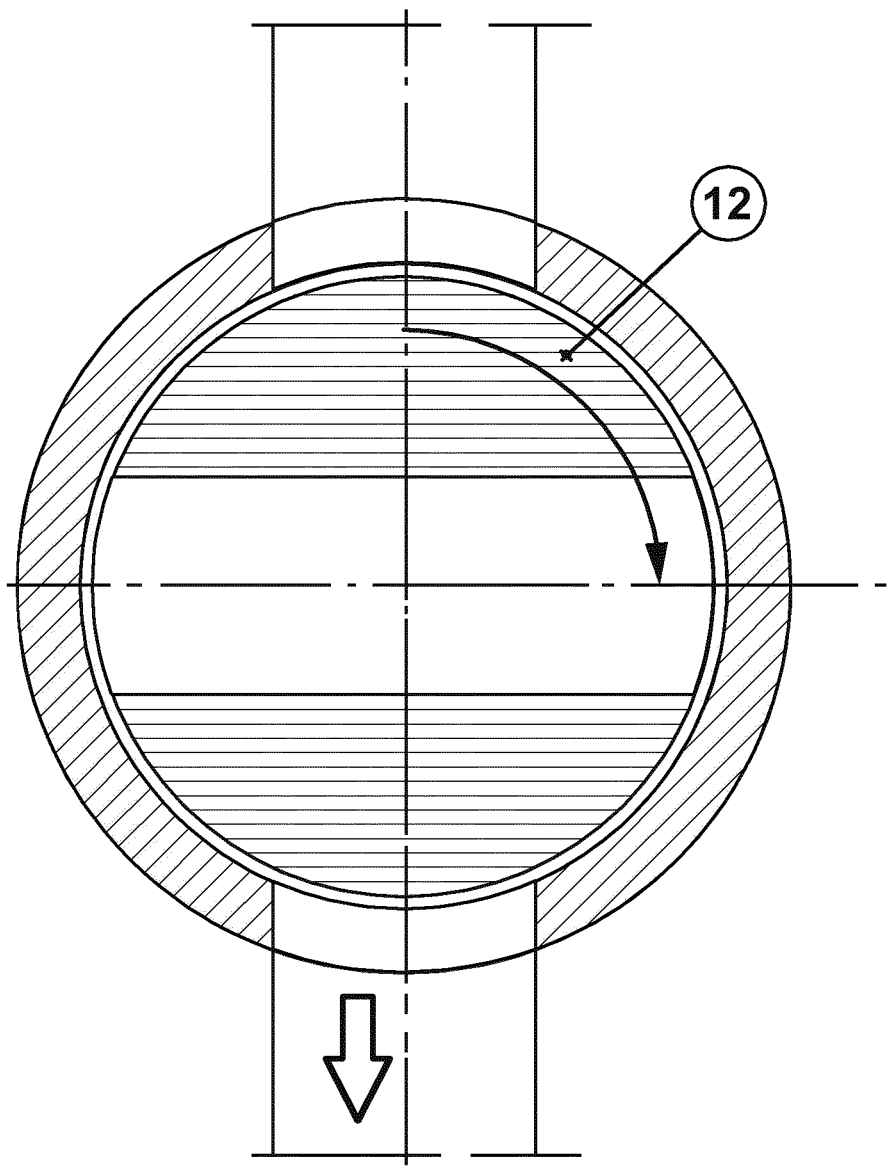

FIG. 7 shows the revolving valve, 1, in a closed position.

Figure 8:
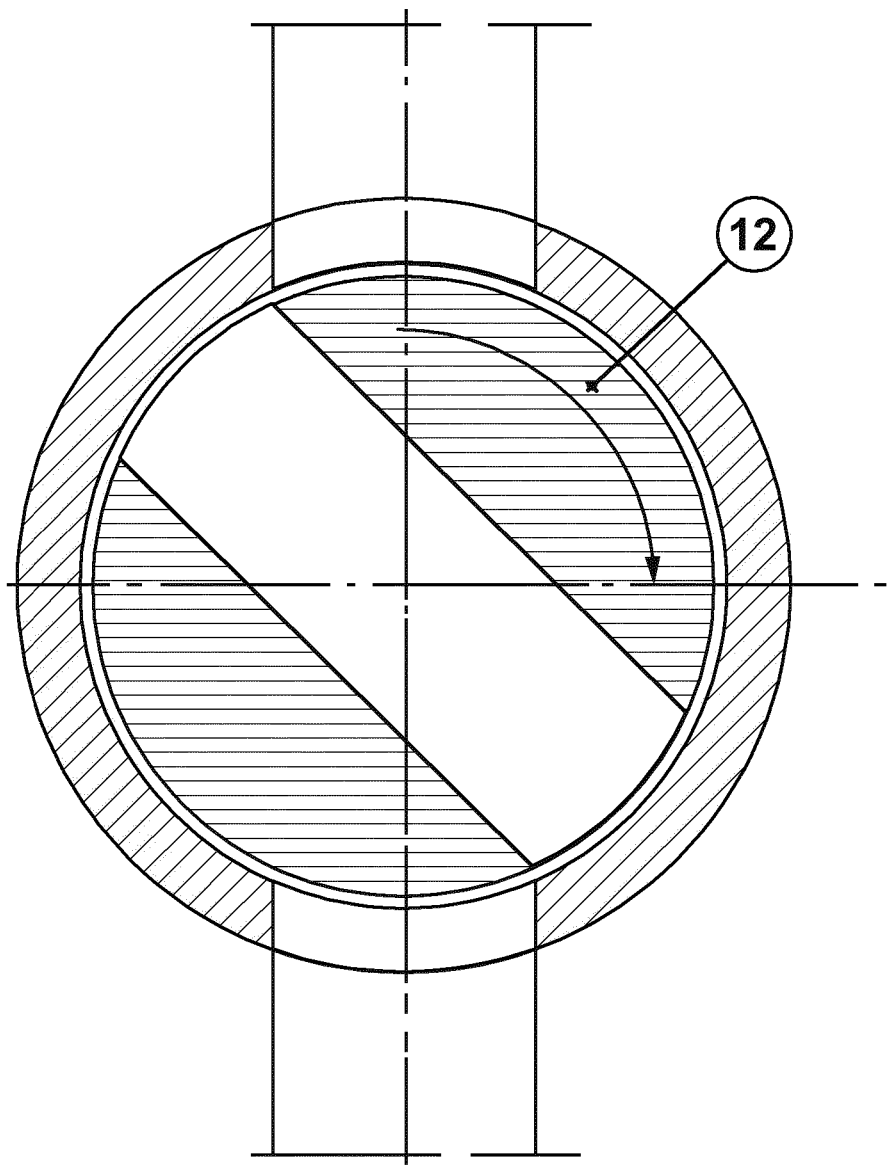

FIG. 8 shows the inner revolving cylinder, 12, of the revolving valve, 1, in a position just before it opens for the air supply from the surge air tank, 4.

Figure 9:
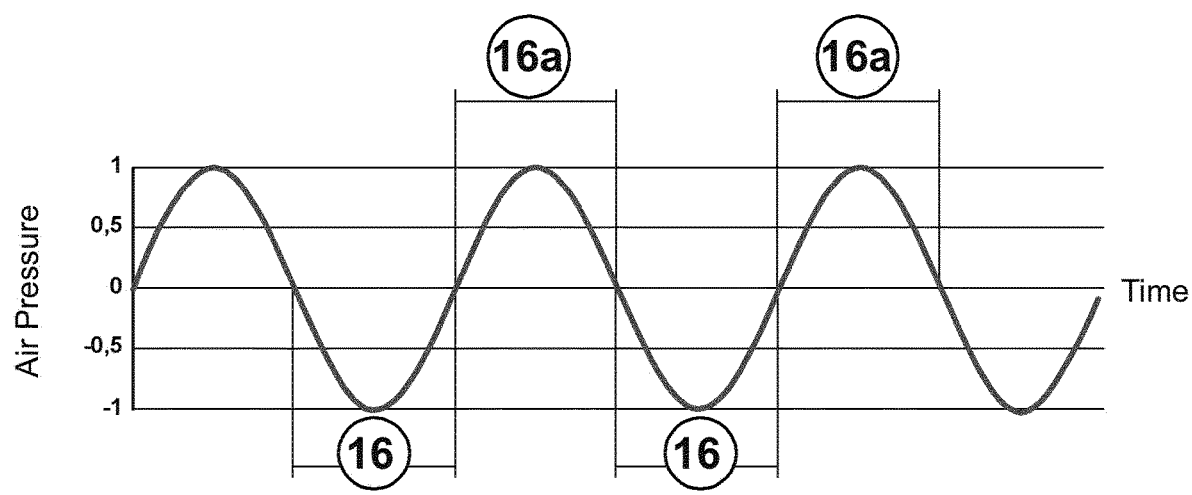

FIG. 9 shows the air pressure, ie sound pressure, as a function of time at the rear end of a resonance tube, 8, with a revolving valve, 1, according to FIGS. 5, 6, 7 and 8, where the dimensions are selected so that the revolving valve, 1, is completely closed during the time intervals, 16, of the oscillation cycle when the air pressure in the rear end of the quarter wave resonance tube is negative.

Figure 10:
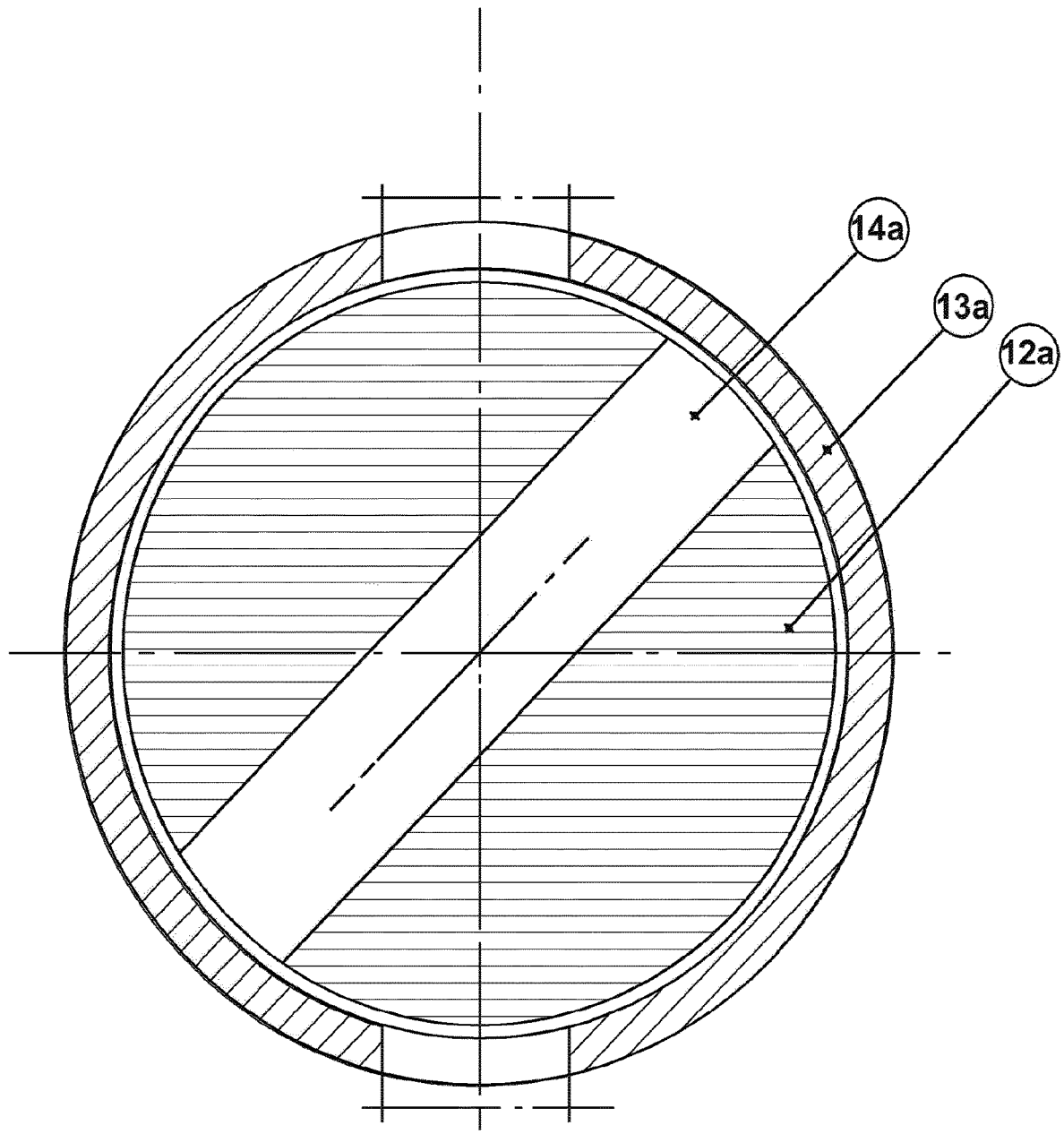

FIG. 10 shows a revolving valve, 1, where both the diameter of the outer cylinder, 13*a*, and the diameter of the inner revolving cylinder, 12*a*, are larger than in FIGS. 5, 6, 7 and 8, but the diameter of the through hole, 14 is the same.

Figure 11:
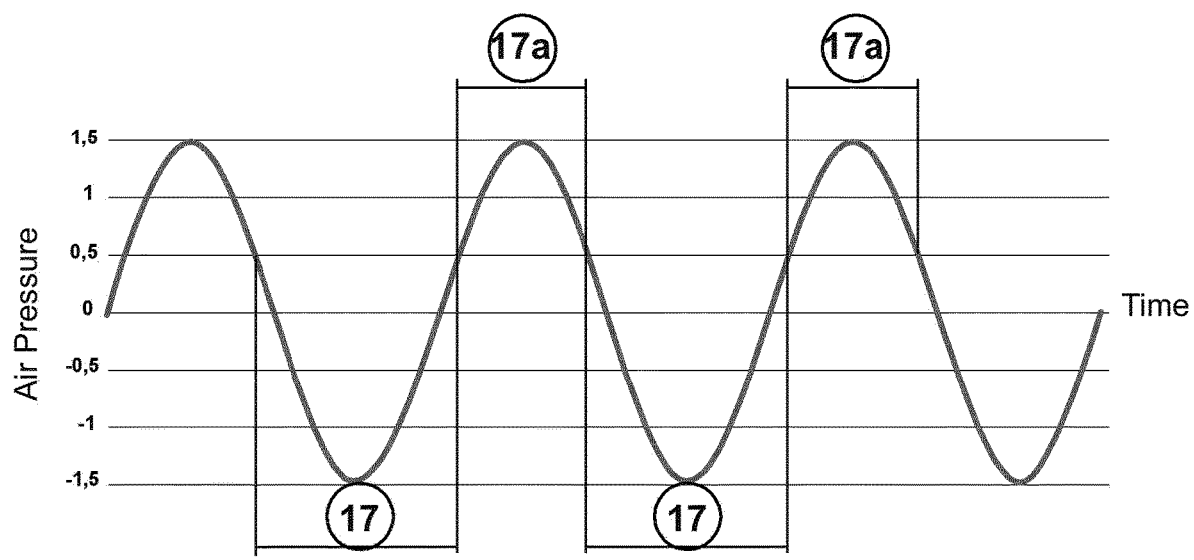

FIG. 11 shows the air pressure, ie sound pressure, as a function of time at the rear end of a resonance tube with a revolving valve, 1, according to FIG. 10 where the dimensions are selected so that the revolving valve, 1, is completely closed during longer time, 17, than the time intervals of the oscillation cycle when the air pressure in the rear end of the quarter wave resonance tube is negative.

Figure 12:
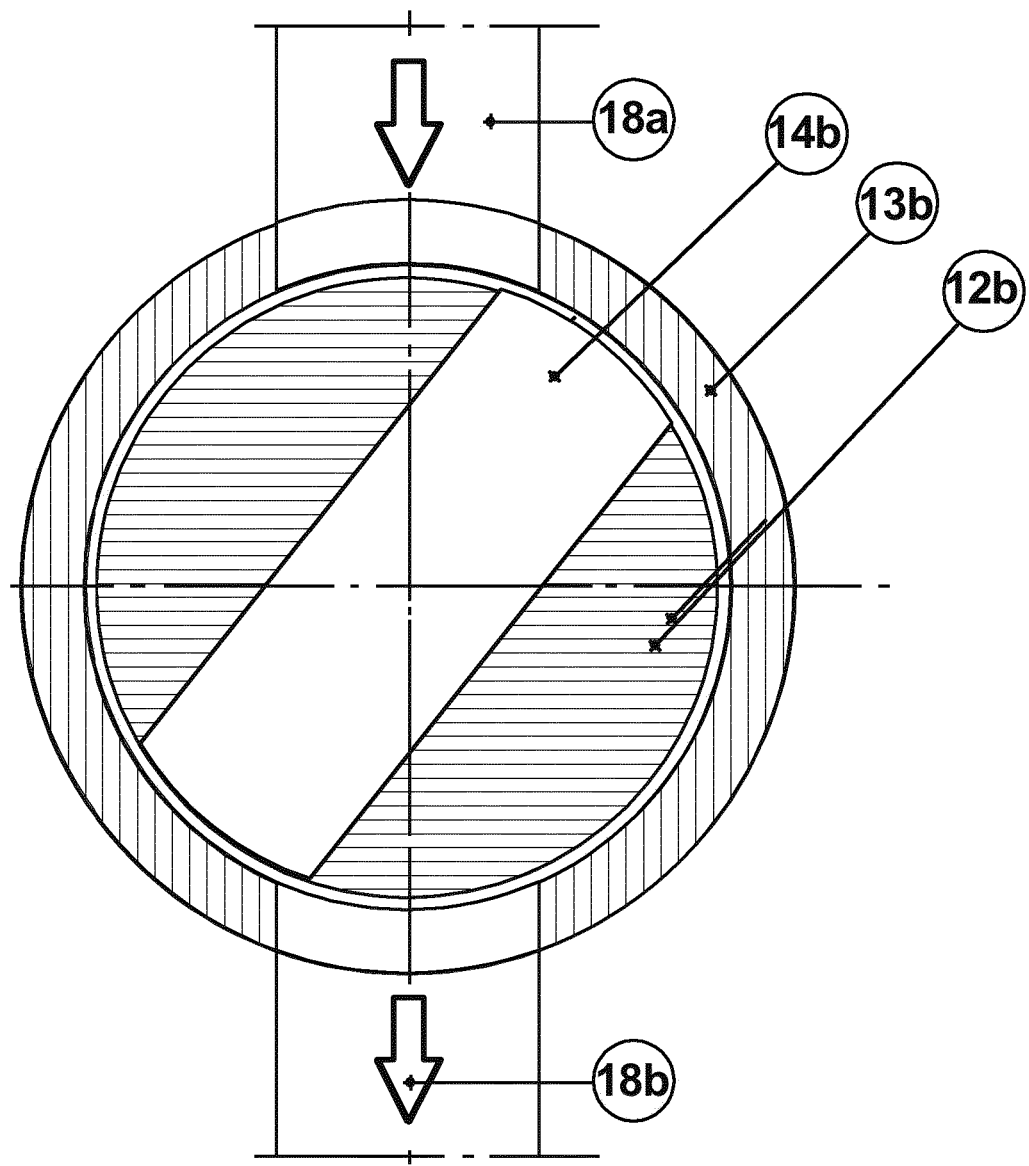

FIG. 12 shows a revolving valve, 1, where both the diameter of the outer cylinder, 13*b*, and the diameter of the inner revolving cylinder, 12*b*, are smaller than in FIGS. 5, 6, 7 and 8, but the diameter of the through hole, 14*b*, is the same. When the inner revolving cylinder, 12*b*, is in the position shown in FIG. 12, a small air flow, 18*a*, 18*b*, passes through the through hole, 14*b*.

Figure 13:
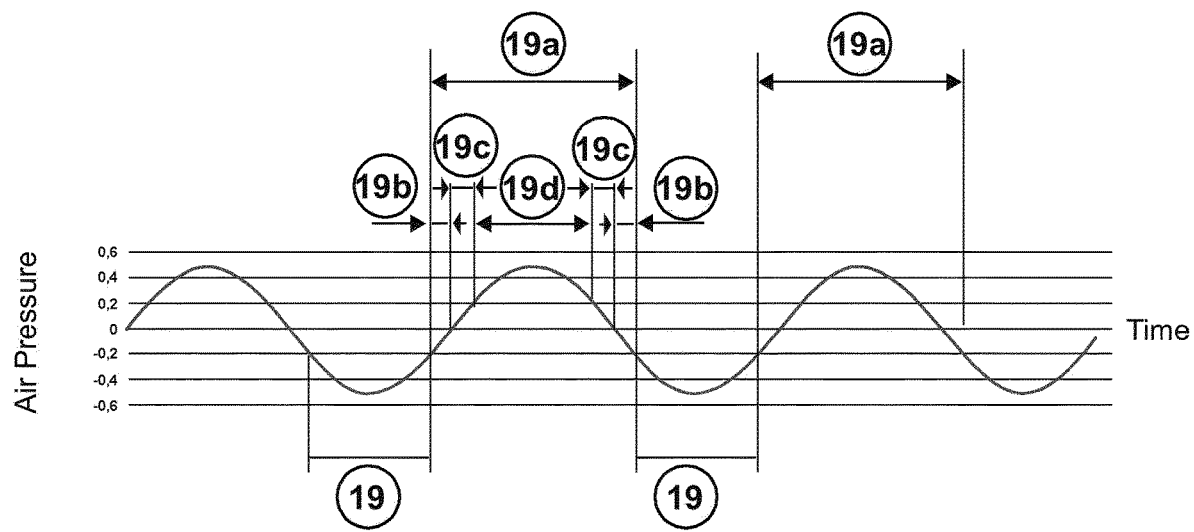

FIG. 13 shows the air pressure (sound pressure) as a function of time at the rear end of a quarter wave resonance tube with a revolving valve, 1, according to FIG. 12 where the dimensions are selected so that the revolving valve, 1, is completely closed during shorter time, 19, than the time intervals of the oscillation cycle when the air pressure in the rear end of the quarter wave resonance tube is negative.

The portion of the air pulse applied during the time interval 19*b*, when the sound pressure in the quarter wave resonance tube is negative, causes a decrease in input power to the low-frequency standing sound wave in the resonance tube.

The portion of the air pulse applied during the time interval 19*c* when the sound pressure in the quarter wave resonance tube is low provides only a small addition of in-put power to the low-frequency standing sound wave in the resonance tube.

This means that a large part of the total supplied air volume during each oscillation is consumed during time intervals when the air pulse reduces in-put power or only gives a small addition of in-put power to the low-frequency standing sound wave in the resonance tube.

A comparison between FIG. 9, FIG. 11 and FIG. 13 shows that the variation in air pressure, ie sound pressure, at the rear end of the resonance tube, is highest in an embodiment of the revolving valve according to FIG. 10.

The in-put power to the standing low-frequency sound wave in a quarter wave resonance tube depends on the magnitude of the variation in air pressure, ie sound pressure. This means that an embodiment according to FIG. 10 gives higher in-put power than the embodiments according to FIGS. 5, 6, 7, 8 and FIG. 12, respectively.

Figure 14:
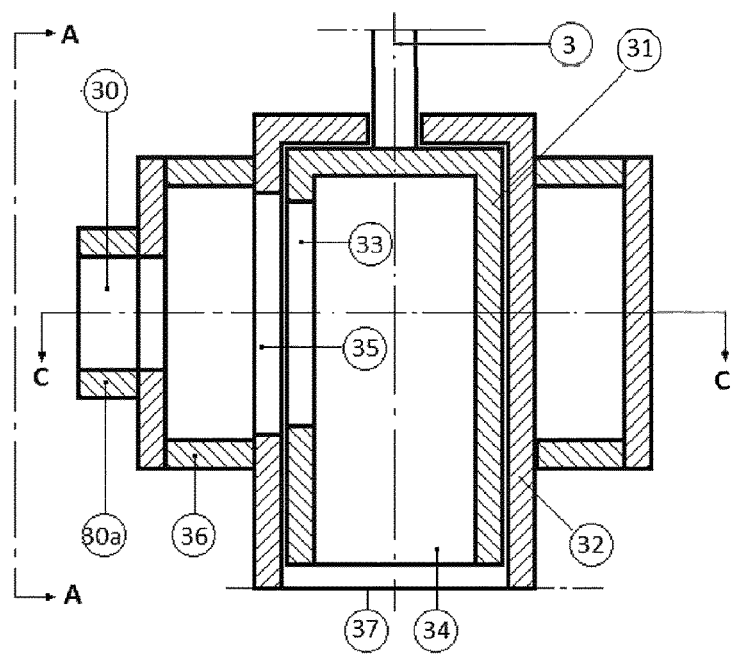

FIG. 14 shows a revolving valve, 1, with a radial flow inlet, 30, and an axial flow outlet, 34. The revolving inner cylinder, 31, of this embodiment of the revolving valve, 1, has an inlet flow hole in the form of a rectangular oblong slit, 33. The axial flow outlet hole, 34, of the revolving inner cylinder, 31, has a much larger cross-sectional area than the area of the rectangular oblong slit, 33. The revolving inner cylinder, 31, revolves in an outer stationary cylinder, 32. The outer stationary cylinder, 32, has a rectangular inlet flow hole, 35 and a connection, 37, to the quarter wave resonance tube, 8. Said rectangular inlet flow hole, 35, is slightly longer in the axial direction than the inlet flow rectangular oblong slit, 33, in the revolving inner cylinder, 31. The opening of said rectangular inlet flow hole perpendicular to the center line is chosen so that the opening angle, β, is approximately 90 degrees. The outer stationary cylinder, 32, has a connection box, 36, and a connection socket 30*a*.

Figure 15:
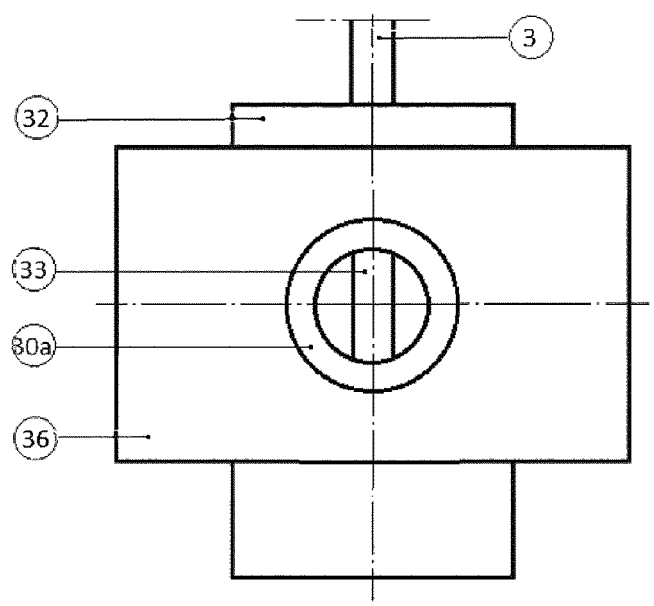

FIG. 15 shows view A-A of the revolving valve according to FIG. 14.

Figure 16:
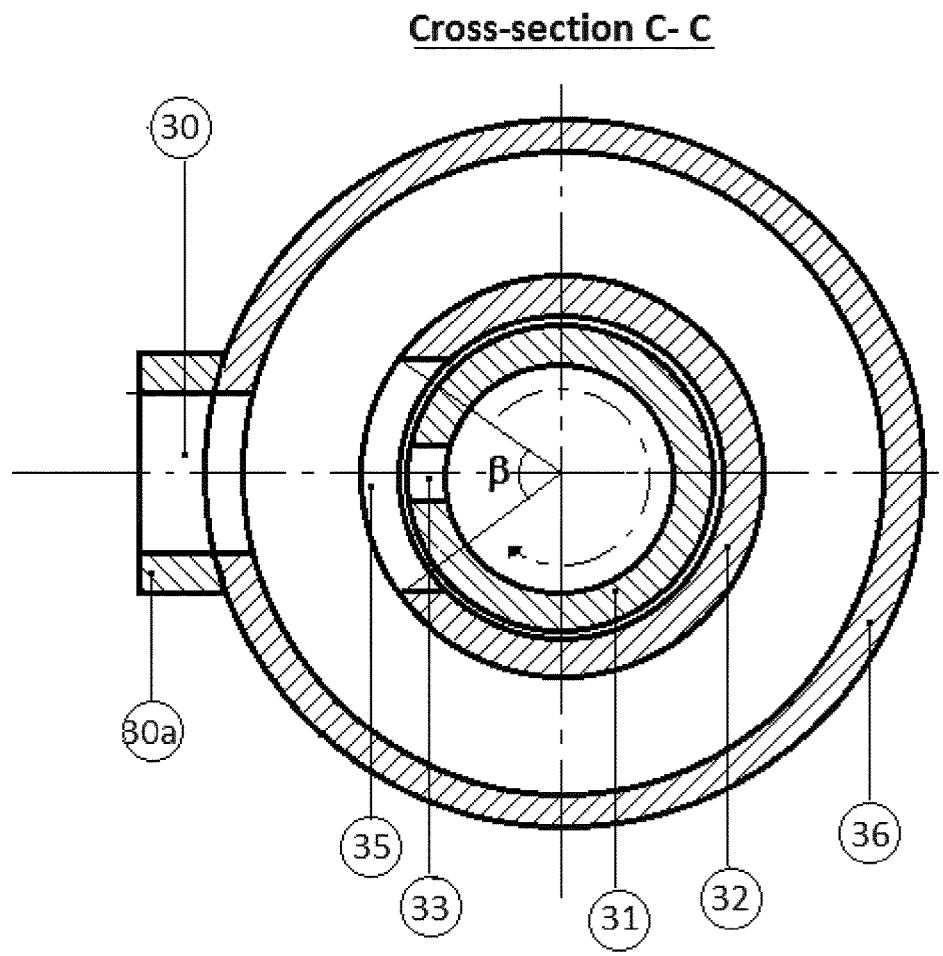

FIG. 16 shows cross-section C-C of the revolving valve according to FIG. 14.

Figure 17:
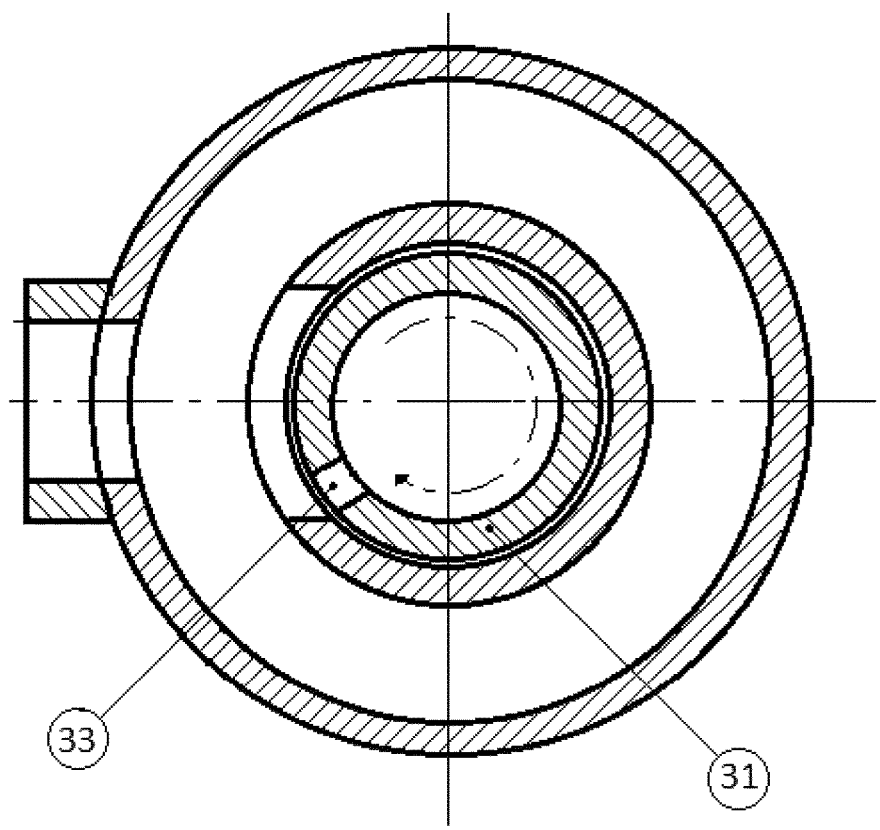

FIG. 17 shows a time moment when the rotating inner cylinder 31 has just opened the passage for pressurized air.

Figure 18:
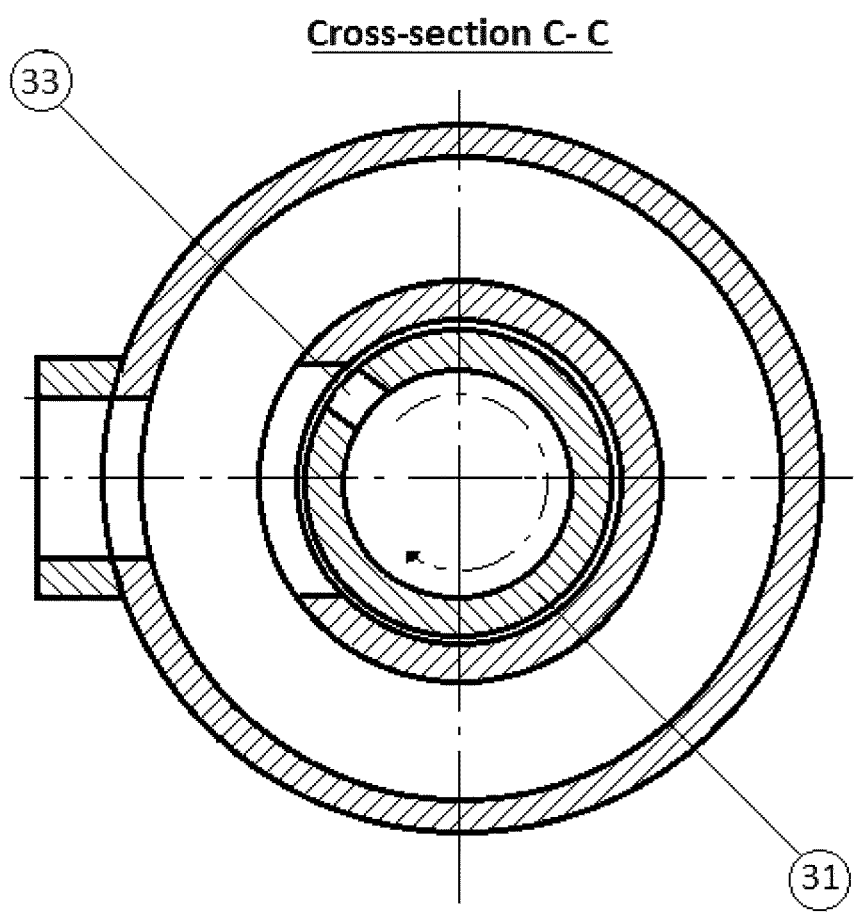

FIG. 18 shows a time moment when the rotating inner cylinder 31 just before it closes the passage for pressurized air.

Figure 19:
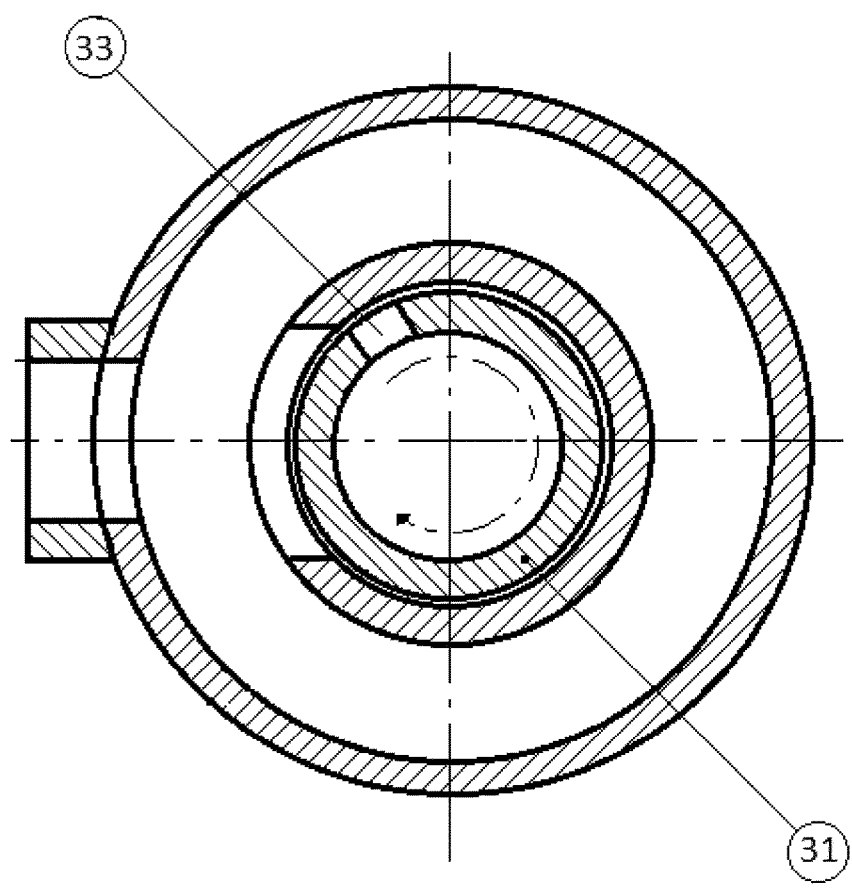

FIG. 19 shows a time moment when the rotating inner cylinder 31 just has closed the passage for pressurized air.

Figure 20:
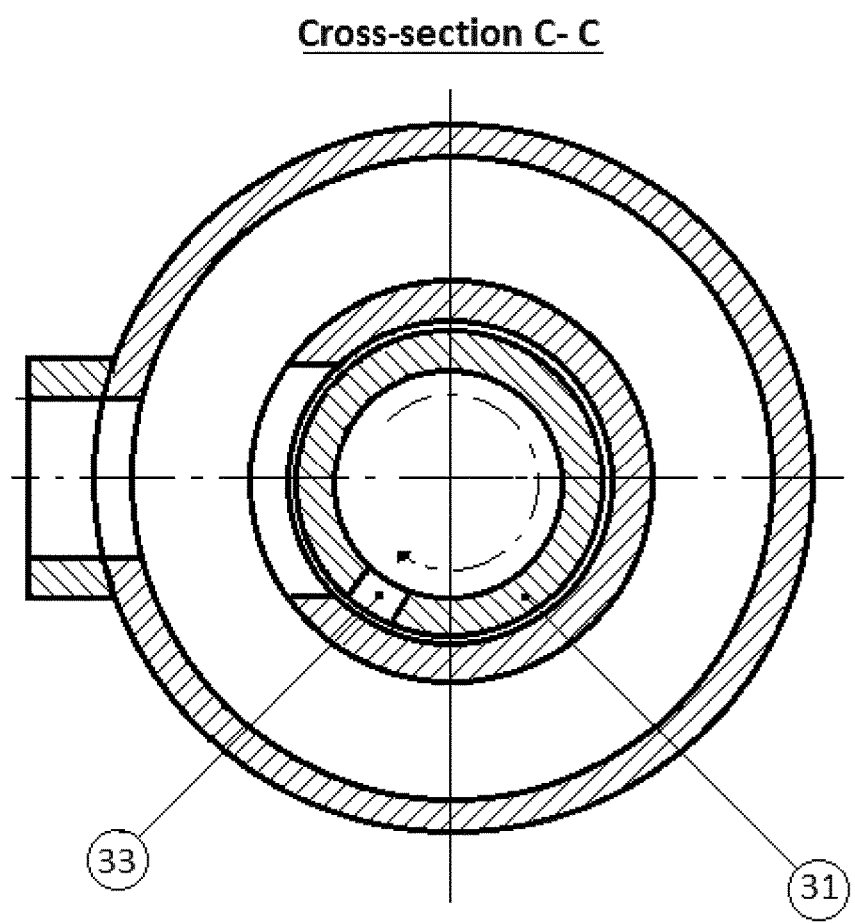

FIG. 20 shows a time moment when the rotating inner cylinder 31 just before it opens the passage for pressurized air.

The advantage of the embodiment according to FIGS. 14, 15, 16, 17, 18, 19 and 20 in comparison with the embodiment according to FIG. 5, is that the physical dimensions are smaller. In addition, the pressure drop of the feeding pressurized air pulses is lower. It will be especially favorable if the angle β in FIG. 16 is about 90 degrees and the width of the inlet flow hole, (33), in the inner revolving cylinder, (31), is half or less of the width of the inlet hole, (35), in the outer stationary cylinder, (32).

Figure 21:
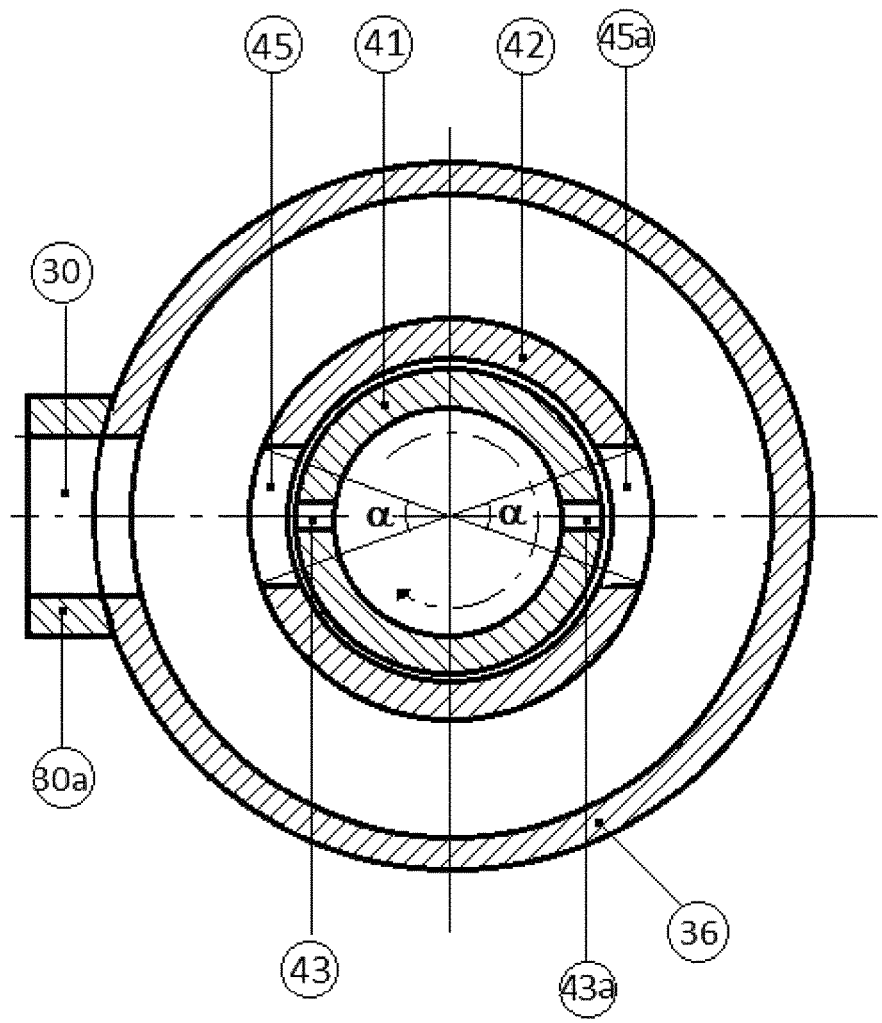

FIG. 21 shows another embodiment where there are two inlet openings, 45 and 45*a*, respectively, in the outer stationary cylinder, 42, and the two inlet openings, 43 and 43*a*, respectively, in the inner rotating cylinder 41.

The two inlet openings 45 and 45*a*, respectively, in the outer stationary cylinder, 42, have a total area equal to the area of the inlet opening, 35, in the outer stationary cylinder 32 according to FIG. 16. The two inlet openings 43 and 43*a*, respectively, in the inner revolving cylinder, 41, has a total area equal to the area of the inlet opening, 33, in the inner revolving cylinder 31 according to FIG. 16.

The sum of the two angles α in FIG. 21 should be approximately 90 degrees.

The advantage of the embodiment according to FIG. 21 in comparison with the embodiment according to FIGS. 14, 15 and 16, is that the inner rotating cylinder, 41, is subjected to a symmetrical force from the pressurized air.

In this patent application, the term low-frequency sound is to be understood as sound with frequencies around 20 Hz and lower.

The benefits of the present invention are:

A. The pressurized air pulses are only supplied during the time intervals of the oscillation cycle when there is a high air pressure, ie sound pressure, in the rear end of the quarter wave resonance tube, which means high in-put of power to the standing sound wave at a given supplied volume of pressurized air. In relation to the embodiment according to patent EP 1 542 810 B1, the consumption of pressurized air for a given input of power to the low-frequency sound wave, can be halved in the present invention.

B. The through hole in the revolving valve can have a large cross-sectional area, which means that there will be small pressure drop of the pressurized air during the passage of from the surge tank to the rear end of the quarter wave resonance tube, which in turn enables the pressurized air to have a low pressure. In relation to the embodiment according to patent EP 1 542 810 B1, the required pressure of the pressurized air can be halved.

C. The advantages A and B as above, respectively, mean that the power requirement for operating a low-frequency sound generator according to the present invention can be reduced by 75%.

The invention claimed is:

1. A method for feeding pressurized air pulses to a rear end of a quarter wave resonance tube for generating a standing low-frequency sound wave in said quarter wave resonance tube, the method comprising:

feeding pressurized air through at least one through hole of a revolving valve consisting of a stationary outer cylinder and an inner revolving cylinder, wherein, as the inner cylinder revolves, pressurized air passes through said at least one through hole during time intervals of the oscillation cycles of said standing low-frequency sound wave when the air pressure in said rear end of the quarter wave resonance tube is positive, and pressurized air is blocked from passing through said through hole during the time intervals of the oscillation cycles of said standing low-frequency sound wave when the air pressure in said rear end of the quarter wave resonance tube is negative, thereby supplying maximum input power to said standing low-frequency sound wave.

2. A revolving valve consisting of:

a stationary outer cylinder, and an inner revolving cylinder with at least one through hole for supplying pressurized air pulses to a rear end of a quarter wave resonance tube for generating a standing low-frequency sound wave in said quarter wave resonance tube, wherein, as the inner cylinder revolves, pressurized air passes through said at least one through hole during time intervals of the oscillation cycles of said standing low-frequency sound wave when the air pressure in said rear end of the quarter wave resonance tube is positive, and pressurized air is blocked from passing through said through hole during the time intervals of the oscillation cycles of said standing low-frequency sound wave when the air pressure in said rear end of the quarter wave resonance tube is negative, thereby supplying maximum input power to said standing low-frequency sound wave.

3. The revolving valve according to claim 2, wherein the dimensions of the outer cylinder, the inner revolving cylinder, and the at least one through hole, respectively, are selected such that the air passage through the at least one through hole is closed for at least half of the cycle time of the revolving valve.

4. The revolving valve according to claim 3, wherein the dimensions of the outer cylinder, the inner cylinder, and the through hole, respectively, are selected in a way that the air passage through the at least one through hole is closed for at least three quarter of the cycle time of the revolving valve.

5. The revolving valve according to claim 2, wherein said inner revolving cylinder has a radial flow inlet and a axial flow outlet, respectively.

6. The revolving valve according to claim 5, wherein the radial flow inlet is in the form of a rectangular oblong slit, and the axial flow outlet is a hole that has a much larger cross-sectional area than the area of the rectangular oblong slit.

7. The revolving valve according to claim 6, wherein said outer stationary cylinder has a rectangular inlet flow hole that is slightly longer in the axial direction than the radial flow inlet in the inner revolving cylinder, wherein the width of the radial flow inlet in the inner revolving cylinder is half or less of the width of said rectangular inlet flow hole in the outer stationary cylinder and wherein the opening of said rectangular inlet flow hole perpendicular to the center line is chosen so that the opening angle, $\beta$, is approximately 90 degrees.

8. The revolving valve according to claim 2, wherein said outer stationary cylinder has two or more rectangular inlet flow holes and said inner revolving cylinder has two or more inlet flow holes, and wherein the total openings of said rectangular inlet flow holes perpendicular to the center line is chosen so that the total opening angles, $2\alpha$, is approximately 90 degrees.

9. A system comprising:

a quarter wave resonance tube; and the revolving valve according to claim 2.

10. The system according to claim 9, further comprising a pressure sensor and a speed-controlled electric motor, wherein the pressure sensor is arranged to measure the air pressure in the rear end of the quarter wave resonance tube, and wherein the speed-controlled electric motor is arranged to drive the revolving valve to be in phase with the low-frequency standing sound wave in the quarter wave resonance tube.

* * * * *